June 19, 1923.
G. E. BLOSS
TIRE CASE
Filed Sept. 14, 1921
1,459,319
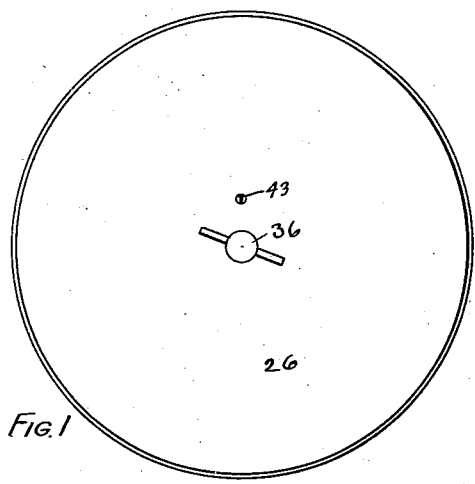
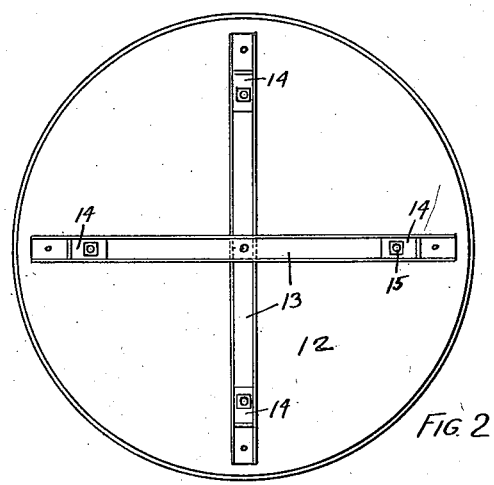
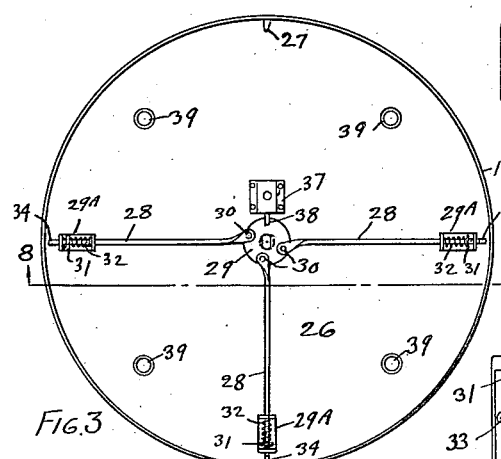
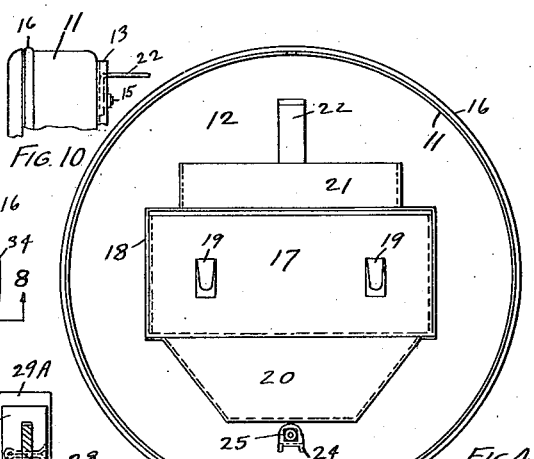
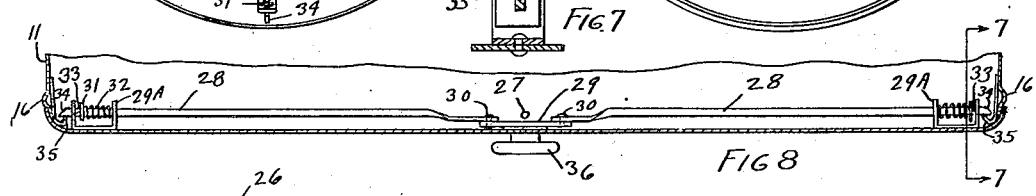
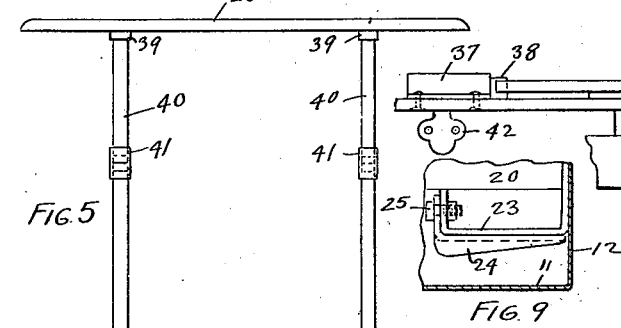
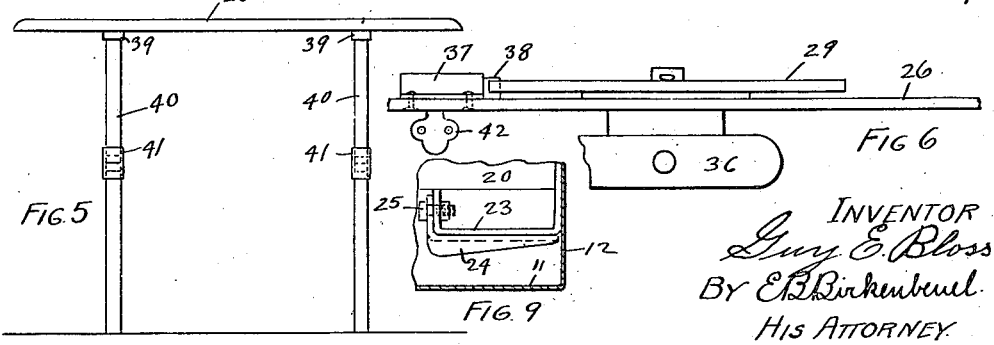
INVENTOR
Guy E. Bloss.
By E. B. Birkenbuel
His Attorney Patented June 19, 1923.

1,459,319

UNITED STATES PATENT OFFICE.

GUY E. BLOSS, OF PORTLAND, OREGON.

TIRE CASE.

Application filed September 14, 1921. Serial No. 500,493.

*To all whom it may concern:*

Be it hereby known that I, GUY E. BLOSS, a citizen of the United States, and a resident of Portland, in the county of Multnomah and State of Oregon, have invented a new and useful Tire Case, of which the following is a specification.

This invention relates more particularly to means for carrying and protecting spare tires on motor vehicles and may be used either on the back or side of a car.

The object of my invention is to provide an exceedingly simple and efficient tire case which will protect the tire from the elements and from mud and dust which ordinarily are as detrimental to tires as is the actual contact with road surfaces. A further object is to provide a drawer and carrying pockets for tools and tire chains, jacks, etc., ordinarily carried under the rear seat, thereby rendering it unnecessary for the occupants to descend when changing a tire. A still further object is accomplished by enabling the owner to use same as a camp table.

I attain these results in the manner set forth in the following specification and illustrated in the accompanying drawing, in which:

Figure 1 is an elevation of the device as it appears when closed. Figure 2 is a rear elevation of the device. Figure 3 is an elevation of the inside of the cover. Figure 4 is an elevation of the device with the cover removed. Figure 5 is an elevation showing the cover being used as a table. Figure 6 is an enlarged detail showing the latch operating disk for securing same. Figure 7 is a sectional view along the line 7—7 in Fig. 8. Figure 8 is an enlarged broken section along the line 8—8 in Fig. 3 with some of the parts removed for clearness. Figure 9 is an enlarged detail of the lower rim engaging clamp. Figure 10 is a partial side elevation of the case showing the depth of a case capable of carrying two tires and the structural supporting brace for attaching the case to the usual brackets provided on automobiles.

Similar numbers of reference refer to the same or similar parts throughout the several views.

Referring in detail to the drawing, I have constructed my tire case of a cylindrical metallic casing 11 across whose back 12 are secured the two channel members 13. Near each end of the channels 13 are secured the angular brackets 14 by means of the bolts 15. These brackets may be of any convenient size or shape to assist in attaching the case to the automobile. A rolled bead 16 is formed around the casing 11 and serves as a shoulder against which the cover can stop, and also makes the union of the case and cover more water and dust tight.

Inside of the case 11 I have provided a metallic drawer 17 which is supported by a box-like frame 18 secured to the inner side of the back 12. Handles 19 on the drawer 17 are made of springy material and are compressed by the cover when the case is closed. The member 18 has a pocket 20 formed on its under side which can be reached by entirely withdrawing the drawer 17. An additional box 21 is placed on top of the member 18 and is used to carry further objects liable to be needed in connection with the tires.

A bracket 22 of heavier material is also secured to the back 12 and is used to support the weight of the tires. A second bracket 23 below the pocket 20 is provided with a wedge-shaped clamp 24 to which it is attached by means of the bolt 25. This clamp is adapted to hold the tires securely in place and prevent rattling.

Turning now to the cover 26 whose inner side is best shown in Fig. 3 it will be observed that I have secured to its upper side a dowel 27 adapted to engage a corresponding hole in the upper side of the case 11. Three latches 28 radiate from a rotatable disk 29 to which they are loosely attached by means of the rivets 30 preferably with slotted holes in the disk 29. Each of the latches 28 is guided at its outer end with a U-shaped guide 29^A between whose parallel sides are placed the slotted washer 31 and the spring 32 through both of which the latch 28 passes. A pin 33 passes through the latch 28 between the washer 31 and the adjacent side of the member 33. The ends 34 of the latches 28 are preferably angled as illustrated. A hook-shaped member 35 is secured to the inside of the case along side of each of the latches 33.

It will be observed that the rim of the cover 26 is formed to cause the cover to fit tightly upon the case and prevent the entrance of dust or water.

A knob 36 in the center of the cover 26 is secured to the disk 29. I have also provided a lock 37 whose bolt 38 can engage a slot in the disk 29 when the latches are in their outermost position. This is preferably not a spring lock but can be so if desired.

Attached to the inside of the cover 26 are four tubular sockets 39 adapted to receive the wooden legs 40 which are preferably hinged near their middle and provided with a sliding ferrule 41, which, by sliding over the hinge, converts the two portions of the leg 40 into one rigid member. This detail, however, is unimportant.

The operation of my device is as follows: When desiring to place one or more tires within my tire case it is necessary to insert a key 42 in the escutcheon 43 and turn same sufficiently to withdraw the bolt 38 from its slot in the disk 29. The knob 36 is then rotated in either direction which will cause the latches 28 to be withdrawn from the hooks 35 and the lower end of the cover 26 may be pulled outwardly, it being suspended from the dowel 27 which is now raised out of its hole and the cover 26 can be lifted away from in front of the tires.

If it is desired to used the cover as a table the legs 40 are merely inserted and the table set up as illustrated.

In placing the cover 26 on the case it is only necessary to hook the dowel 27 into its hole and press the sides of the cover 26 against the case 11 at each of the latches 28 whose loose connections to the disk 29 will permit them to latch independently of their mates, but it is evident that it will be necessary to disengage the latches 28 in unison since they are operated by one controlling disk 29.

I am aware that many minor refinements can be applied to this device but I have illustrated herein only such essential factors as are necessary to make the case a practical and inexpensive means for accomplishing the purposes above referred to, and that numerous devices have been patented purporting to protect tires and carry tools. I therefore do not claim my device broadly but only within the limits of the following claim.

I claim:

In a tire case, the combination of a cylindrical body member arranged to be attached to an automobile and to support automobile tires internally, a metallic cover adapted to seat closely on said body, said cover having on the center of its inner side a disk rotatable from the outside of said cover, a lock for controlling the rotation of said disk, a plurality of plungers loosely connected to said disk, a U-shaped guide at the outer end of each of said plungers secured to the inner side of said cover, a spring on each of said plungers between the parallel sides of each guide adapted to urge said plungers outwardly, catches secured on the inner side of said body opposite said plungers, a dowel pin on the upper side of said cover adapted to engage a corresponding hole in said body, and a set of legs removably attached to the under side of said cover.

GUY E. BLOSS